United States Patent
Aramcharoen et al.

(10) Patent No.: US 9,969,034 B2
(45) Date of Patent: May 15, 2018

(54) VIBROPEENING SYSTEM AND A METHOD OF USING THE SAME

(71) Applicants: ROLLS-ROYCE plc, London (GB); ROLLS-ROYCE DEUTSCHLAND LTD & CO KG, Blankenfelde-Mahlow, Dahlewitz (DE)

(72) Inventors: Ampara Aramcharoen, Singapore (SG); Goetz G Feldmann, Oberursel (DE); Chow Cher Wong, Singapore (SG); Paul Barrowman, Derby (GB); Swee Huat Ang, Singapore (SG)

(73) Assignees: ROLLS-ROYCE PLC, London (GB); ROLLS-ROYCE DEUTSCHLAND LTD & CO KG, Blankenfelde-Mahlow (DE)

( * ) Notice: Subject to any disclaimer, the term of this patent is extended or adjusted under 35 U.S.C. 154(b) by 0 days. days.

(21) Appl. No.: 15/610,042

(22) Filed: May 31, 2017

(65) Prior Publication Data
US 2017/0348809 A1    Dec. 7, 2017

(30) Foreign Application Priority Data
Jun. 2, 2016 (GB) .................................. 1609621.6

(51) Int. Cl.
| | |
|---|---|
| *B24B 31/02* | (2006.01) |
| *B23P 9/00* | (2006.01) |
| *B21D 31/06* | (2006.01) |
| *B24B 31/06* | (2006.01) |
| *B23P 15/02* | (2006.01) |
| *C21D 7/06* | (2006.01) |

(52) U.S. Cl.
CPC ................ *B23P 9/00* (2013.01); *B21D 31/06* (2013.01); *B23P 15/02* (2013.01); *B24B 31/062* (2013.01); *C21D 7/06* (2013.01)

(58) Field of Classification Search
CPC . B21D 31/06; B23P 15/02; B23P 9/00; B24B 31/062; B24B 31/06; C21D 7/06
USPC ............................................................. 72/53
See application file for complete search history.

(56) References Cited

U.S. PATENT DOCUMENTS

| | | | |
|---|---|---|---|
| 2,809,473 A | 10/1957 | Heaphy | |
| 4,263,797 A * | 4/1981 | Cooper | ................... B21K 1/72 104/307 |

(Continued)

FOREIGN PATENT DOCUMENTS

| | | |
|---|---|---|
| FR | 2505710 A1 | 11/1982 |
| RU | 2009848 C1 | 3/1994 |

(Continued)

OTHER PUBLICATIONS

Nov. 10, 2016 Search Report issued in British Patent Application No. 1609621.6.

*Primary Examiner* — David B Jones
(74) *Attorney, Agent, or Firm* — Oliff PLC

(57) ABSTRACT

A vibropeening apparatus comprises a main frame, an enclosure receivable within the main frame, a rotary drive mechanism, and an article to be vibropeened. The enclosure defines an internal volume, the internal volume accommodating a vibropeening bed. The article is positioned within the internal volume, and the rotary drive mechanism is to configured to impart a rotary motion to the enclosure within the main frame.

14 Claims, 5 Drawing Sheets

(56) References Cited

U.S. PATENT DOCUMENTS

| | | | | |
|---|---|---|---|---|
| 5,018,312 A | * | 5/1991 | Steckis | B08B 7/0092 241/65 |
| 5,950,470 A | * | 9/1999 | Prewo | B24B 31/006 72/430 |
| 9,770,806 B2 | * | 9/2017 | Kaga | B24C 3/30 |

FOREIGN PATENT DOCUMENTS

| | | |
|---|---|---|
| SU | 984832 A1 | 12/1982 |
| WO | 2016/062856 A1 | 4/2016 |

* cited by examiner

VIBROPEENING SYSTEM AND A METHOD OF USING THE SAME

This disclosure claims the benefit of UK Patent Application No. GB1609621.6, filed on 2 Jun. 2016, which is hereby incorporated herein in its entirety.

FIELD OF THE DISCLOSURE

The present disclosure relates to a method and apparatus for vibropeening metallic components and particularly, but not exclusively, to a method and apparatus for vibropeening metallic components for a gas turbine engine.

BACKGROUND TO THE DISCLOSURE

It is well known to employ surface finishing techniques to improve the surface finish and fatigue cycle life of metallic articles. Examples of such surface finishing techniques include shot peening and vibrofinishing.

Shot peening involves directing a stream of steel, ceramic or glass peening media at the surface of the article. The impact of the peening media on the surface introduces compressive residual stresses into the surface layer of the article. These compressive residual stresses improve the high cycle fatigue strength of the article.

Vibrofinishing, on the other hand, involves immersing the article in a container together with a polishing mixture. The polishing mixture is typically made from polishing chips (usually plastic or ceramic), an abrasive paste and water. Vibration of the container causes the polishing mixture to flow around the article, resulting in removal of material from the surface of the article. The vibrofinishing process typically employed to reduce the surface roughness of an article, for example to improve aerodynamic performance of a turbine or compressor blade.

Shot peening and vibrofinishing processes are often applied to the same article in sequence. This can be time consuming.

Vibropeening is a surface finishing technique that combines the improvement in residual compressive stress provided by shot peening, with the reduction in surface roughness provided by vibrofinishing. This combination makes the vibropeening process quicker and more cost effective than the prior art combination of shot peening and vibrofinishing.

In the vibropeening process, the article to be processed is immersed in a trough, which is filled up with a stainless steel media, and vibrational energy is provided to the trough. Additionally, the article may be rotated within the trough to further increase the level of interaction between the media and the surface of the article.

FIG. 1 illustrates a typical vibropeening apparatus 10 according to the prior art. The vibropeening apparatus 10 comprises a housing 20 within which is located a mounting frame 30 having a motor drive 40. The housing 20 accommodates a vibropeening bed 50 with the article 60 to be vibropeened being attached to the mounting frame 30 and suspended within the vibropeening bed 50. The motor drive 40 rotates the article 60 within the vibropeening bed 50.

However, a problem occurs with the vibropeening process when the article that is being processed has a large and particularly irregular geometry. In such situations, the vibropeening process may result in the component having low peening intensity, irregular peening treatment across the surface of the article, and, in worst cases, high distortion.

STATEMENTS OF DISCLOSURE

According to an aspect of the present disclosure there is provided a vibropeening apparatus comprising:
a main frame;
an enclosure receivable within the main frame:
a rotary drive mechanism; and
an article to be vibropeened,
wherein the enclosure defines an internal volume, the internal volume accommodating a vibropeening bed, the article being positioned within the internal volume, and the rotary drive mechanism being configured to impart a rotary motion to the enclosure within the main frame.

The enclosure is accommodated within the main frame. The internal volume of the enclosure is less than the corresponding volume of the main frame. This makes the volume of the vibropeening bed accommodated within the enclosure smaller than the volume of a vibropeening bed accommodated within the main frame. This makes the vibropeening apparatus of the present invention more cost effective than the prior art equivalent.

Optionally, when the article is positioned within the internal volume, a predetermined clearance is defined between the article and the enclosure.

By providing a predetermined clearance between the article and the enclosure, the vibropeening bed will provide a vibropeening effect uniformly over the entire surface of the article. This makes the apparatus of the present invention more efficient than the prior art equivalent.

The predetermined clearance between the article and the enclosure reduces the volume of the vibropeening bed over the prior art equivalent in which the vibropeening bed fills the main frame. This reduces the cost of the vibropeening apparatus because there is less vibropeening media.

In addition, the predetermined clearance between the article and the enclosure reduces the energy consumption of the vibropeening apparatus because there is a smaller distance over which the vibratory excitation energy can be dissipated, i.e. the smaller distance between the article and the enclosure. This makes the apparatus of the present invention more efficient than the prior art and therefore more convenient for a user.

Optionally, the vibropeening bed comprises a plurality of media particles, the media particles having a mean media particle size.

Typically, the media particles will comprise spherical stainless steel particles with a mean media particle size of 5 mm. In this case, the mean media particle size is the diameter of the spherical particles.

In an alternative arrangement, the media particles may take an alternative geometry such as, for example, ovoid or cylindrical. In such cases, the mean media particle size is a dimension that is characteristic of the particle geometry. For example, for a cylindrical particle geometry, the mean media particle size may be the cylindrical length.

Optionally, the predetermined clearance is approximately between five (5) and ten (10) times the mean media particle size.

In one arrangement, the mean media particle size is 5 mm, and the predetermined clearance between the article and the casing is 40 mm, which makes the predetermined clearance eight (8) times the mean media particle size.

In other arrangements, the predetermined clearance may be between five and ten times the mean media particle size.

Optionally, the enclosure is removably mounted within the main frame.

By being removable, the enclosure can readily be prepared out with the vibropeening apparatus and simply installed in main frame when required for use. This makes the vibropeening apparatus of the present invention more convenient for a user than the prior art equivalent.

Optionally, the enclosure comprises a feed aperture, the feed aperture allowing for the ingress and egress of media particles.

Once an article has been mounted in the enclosure, it is necessary to fill the enclosure with the vibropeening media particles to create the vibropeening bed. The feed aperture provides a user with the facility to load the enclosure with the vibropeening media particles. This makes the vibropeening apparatus of the present invention more convenient for a user than the prior art equivalent.

Optionally, the enclosure comprises an inner surface, the inner surface being formed from a thermoplastic polymeric material.

Conventionally, the vibropeening bed is enclosed by a surface formed from a rubber material. This rubber material absorbs some of the vibratory energy provided to the vibropeening bed, which reduces the energy efficiency of such prior art arrangements.

By forming the inner surface of the enclosure from a thermoplastic there is a smaller loss of vibratory energy within the vibropeening bed. This makes the vibropeening apparatus of the present invention more efficient than the prior art equivalent, and hence more convenient for a user.

Optionally, the enclosure further comprises a first end and an opposite second end, and an axis of rotation extending between the first end and the second end, and the article is removably secured to an internal surface of the first end of the enclosure.

In one arrangement, the article is secured to an internal surface of one of the axial internal ends of the enclosure. In this way, the article extends axially into the enclosure, and is rotated about this axis.

The orientation of the article within the enclosure may be chosen on the basis of the geometry of the article itself. For example, an article having an elongate geometry may be secured to the enclosure with the elongate axis aligned with the axis of rotation of the enclosure. This enables the vibropeening apparatus of the present invention to readily accommodate articles having elongate geometries.

Optionally, the enclosure further comprises a window allowing a visual inspection of the vibropeening bed.

The window in the enclosure enables a user to visualise the media flow within the enclosure. This provides a measure of diagnostic capability to the user in the event of the vibropeening bed not operating correctly, which makes the apparatus of the present invention more convenient to a user than the prior art equivalent.

Optionally, the rotary motion is a unidirectional rotary motion.

Providing unidirectional rotary motion to the enclosure makes the apparatus of the present invention and its control simple and cost effective for a user.

Optionally, the rotary motion is an oscillatory rotary motion.

Providing the enclosure with oscillatory rotary motion may enable the vibropeening of articles having a convoluted geometry to be completed more quickly than with a unidirectional rotary motion.

According to a second aspect of the present disclosure there is provided a method of using a vibropeening apparatus, the apparatus comprising a main frame, an enclosure receivable within the main frame, and a rotary drive mechanism configured to rotate the enclosure, the method comprising the steps of:
  providing a vibropeening bed within the enclosure;
  positioning an article to be vibropeened within the vibropeening bed;
  actuating the vibropeening bed; and
  rotating the enclosure within the main frame.

The enclosure is accommodated within the main frame. The internal volume of the enclosure is less than the corresponding volume of the main frame. This makes the volume of the vibropeening bed accommodated within the enclosure, smaller than the volume of a vibropeening bed accommodated within the main frame. This makes the vibropeening apparatus of the present invention more cost effective than that of the prior art equivalent.

Optionally, the step of positioning an article to be vibropeened within the enclosure, comprises the step of:
  positioning an article to be vibropeened within the enclosure such that a predetermined clearance is defined between the article and the casing By providing a predetermined clearance between the article and the enclosure, the vibropeening bed will provide a vibropeening effect uniformly over the entire surface of the article. This makes the apparatus of the present invention more efficient than the prior art equivalent.

The predetermined clearance between the article and the enclosure reduces the volume of the vibropeening bed over the prior art equivalent in which the vibropeening bed fills the main frame. This reduces the cost of the vibropeening apparatus because there is less vibropeening media.

In addition, the predetermined clearance between the article and the enclosure reduces the energy consumption of the vibropeening apparatus because there is a smaller distance over which the vibratory excitation energy can be dissipated, i.e. the smaller distance between the article and the enclosure. This makes the apparatus of the present invention more efficient than the prior art and therefore more convenient for a user.

Optionally, the step of positioning an article to be vibropeened within the enclosure, comprises the additional following step of:
  attaching the article to one end of the enclosure.

In one arrangement, the article is secured to an internal surface of one of the axial internal ends of the enclosure. In this way, the article extends axially into the enclosure, and is rotated about this axis.

The orientation of the article within the enclosure may be chosen on the basis of the geometry of the article itself. For example, an article having an elongate geometry may be secured to the enclosure with the elongate axis aligned with the axis of rotation of the enclosure. This enables the vibropeening apparatus of the present invention to readily accommodate articles having elongate geometries.

Optionally, the step of rotating the enclosure comprises the step of:
  rotating the enclosure in a unidirectional manner.

Providing unidirectional rotary motion to the enclosure makes the apparatus of the present invention and its control simple and cost effective for a user.

Optionally, the step of rotating the enclosure comprises the step of:
  rotating the enclosure in an oscillatory manner.

Providing the enclosure with oscillatory rotary motion may enable the vibropeening of articles having a convoluted or asymmetric geometry to be completed more quickly than with a unidirectional rotary motion.

Other aspects of the disclosure provide devices, methods and systems which include and/or implement some or all of the actions described herein. The illustrative aspects of the disclosure are designed to solve one or more of the problems herein described and/or one or more other problems not discussed.

BRIEF DESCRIPTION OF THE DRAWINGS

There now follows a description of an embodiment of the disclosure, by way of non-limiting example, with reference being made to the accompanying drawings in which.

It is noted that the drawings may not be to scale. The drawings are intended to depict only typical aspects of the disclosure, and therefore should not be considered as limiting the scope of the disclosure. In the drawings, like numbering represents like elements between the drawings.

DETAILED DESCRIPTION

Figure 1:
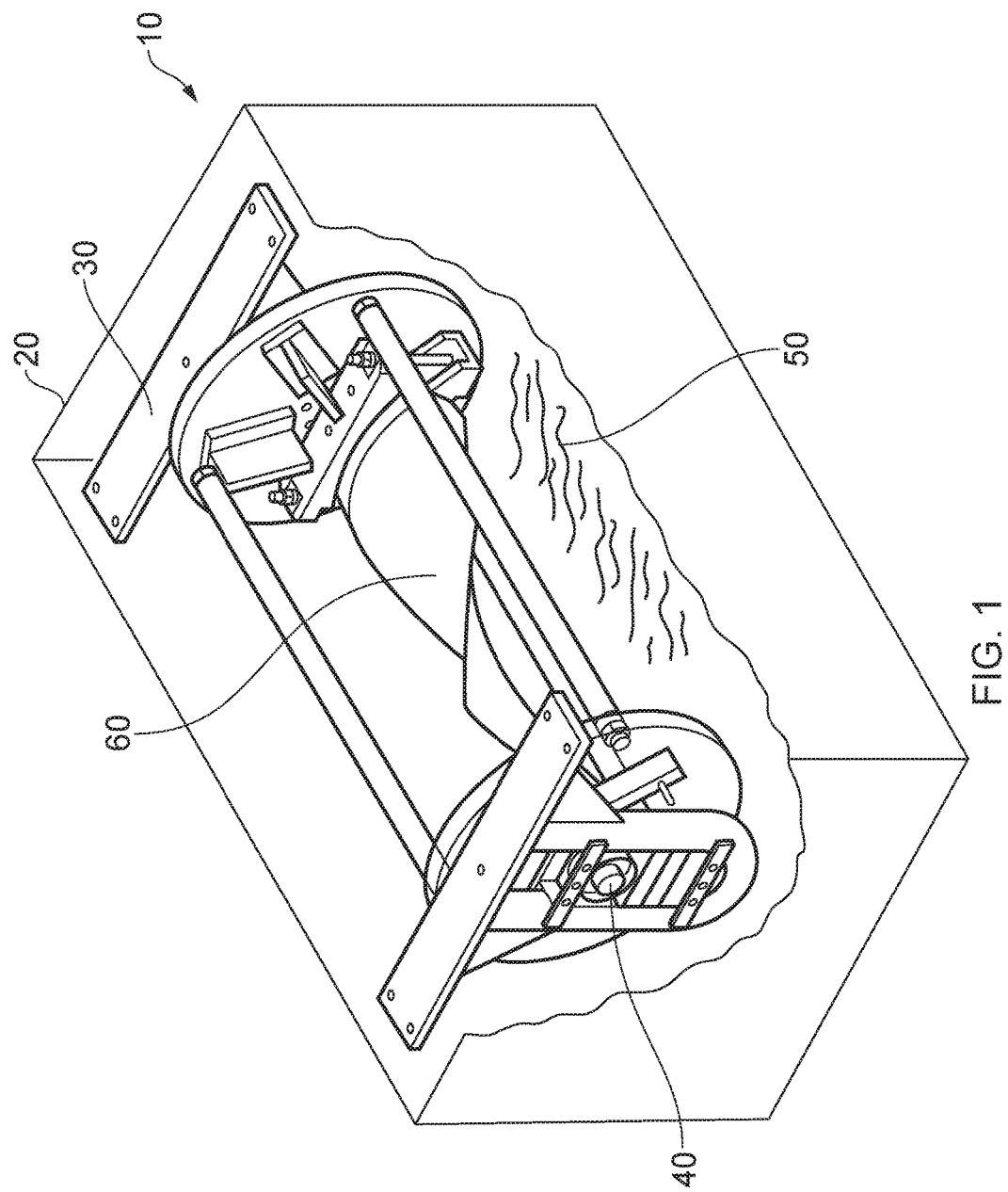
FIG. 1 shows a perspective, part-sectional view of a vibropeening apparatus according to the prior art.
Figure 2:
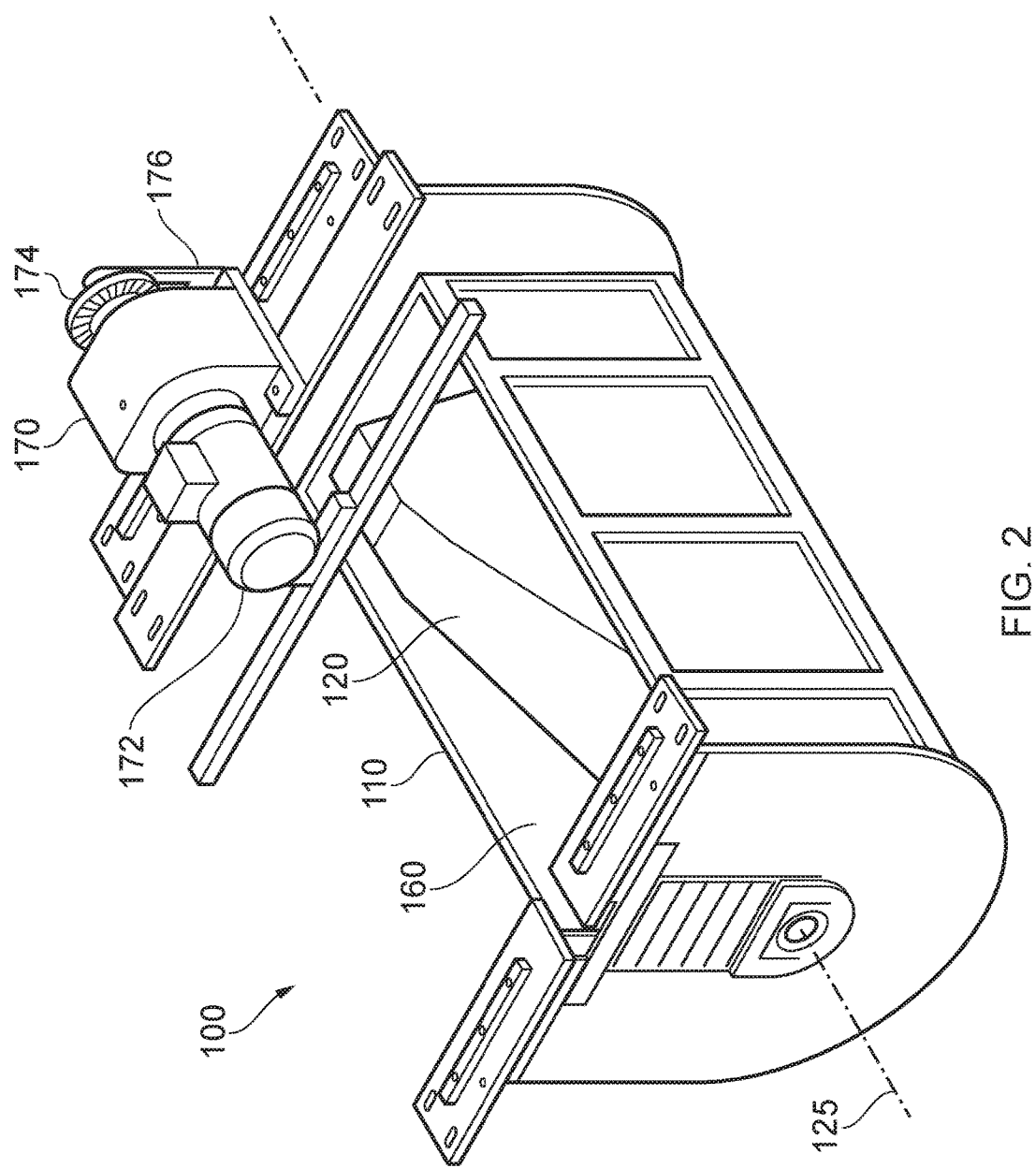
FIG. 2 shows a perspective view of a vibropeening apparatus according to an embodiment of the disclosure.
Figure 3:
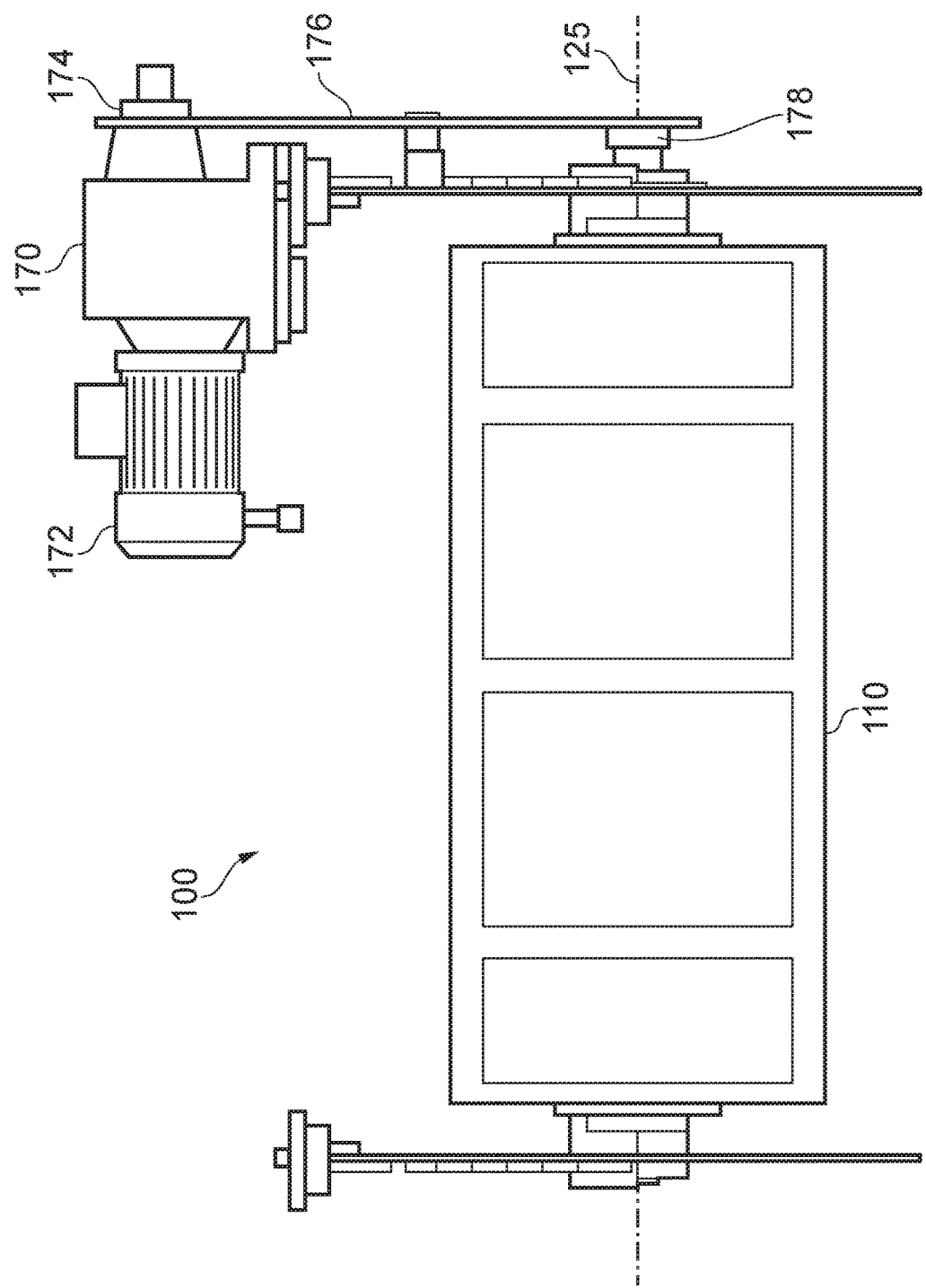
FIG. 3 shows an elevational view of the vibropeening apparatus of FIG. 2.
Figure 4:
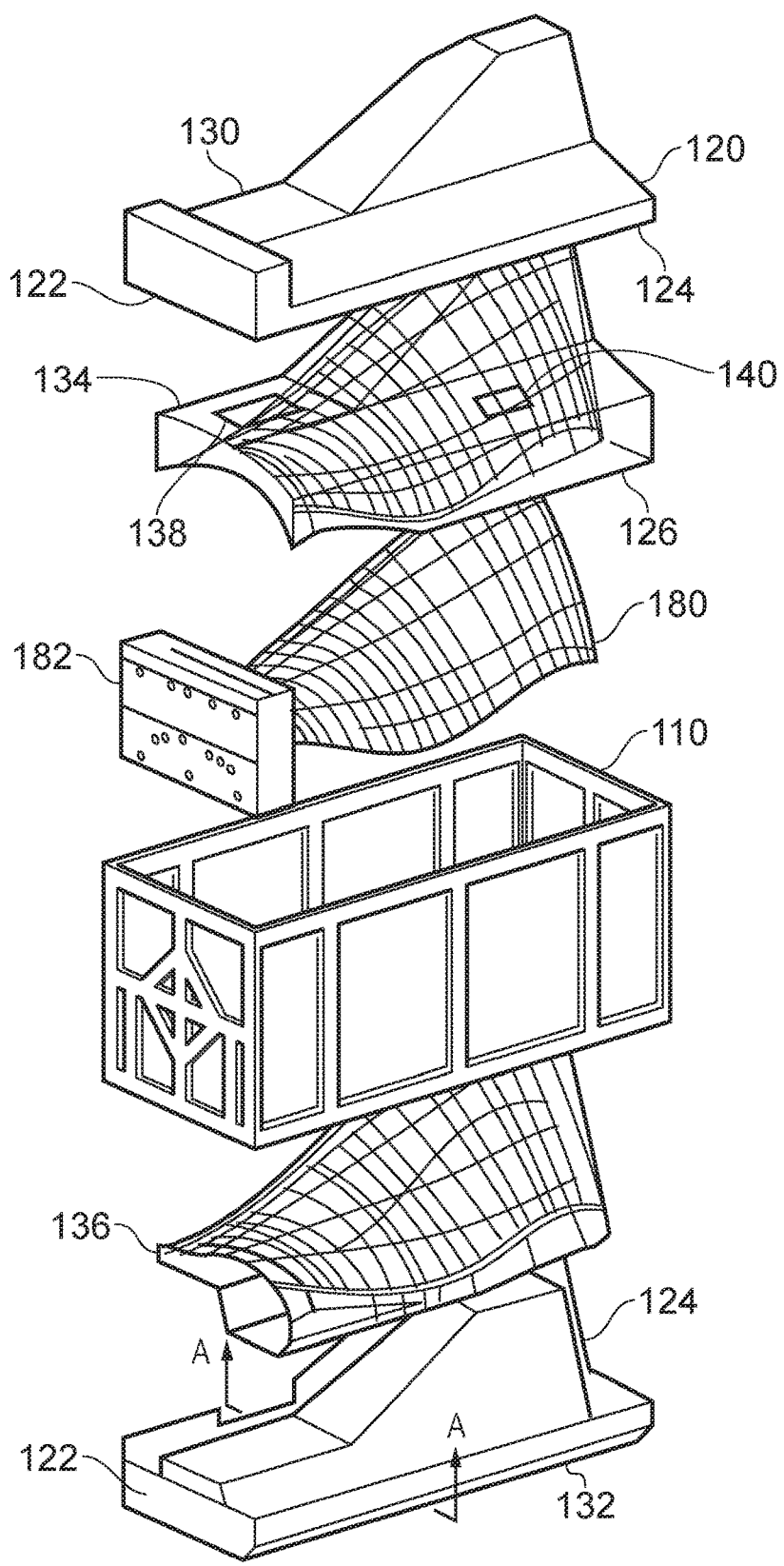
FIG. 4 shows a perspective exploded view of the main frame and enclosure of the vibropeening apparatus of FIG. 2.

Referring to FIGS. 2 to 5, a vibropeening apparatus according to an embodiment of the disclosure is designated generally by the reference numeral 100.

The vibropeening apparatus 100 has a main frame 110, an enclosure 120 receivable within the main frame 110, a rotary drive mechanism 170 and an article 180 to be vibropeened. In the present example, the article 180 is a fan blade for a turbofan gas turbine engine.

The main frame 110 takes the form of a rectangular enclosure. In the present arrangement, the main frame 110 is formed as a steel fabrication. However, in alternative arrangements, the main frame 110 may be formed from another metal, such as an aluminium alloy, or from a composite material, such as carbon fibre reinforced composite.

The enclosure 120 is positioned within the main frame 110 such that it is fully enclosed by the main frame 110, but has sufficient clearance around it that it is able to be rotated to around an axis of rotation 125 of the enclosure 120. In the present arrangement, the enclosure 120 is arranged to be removable from the main frame 110. In other arrangements, the enclosure 120 may be mounted as an integral part of the main frame.

The enclosure 120 has a first end 122 and an opposite second end 124. The enclosure 120 has an axis of rotation 125 that extends between the first end 122 and the second end 124. The enclosure 120 rotates about the axis of rotation 125 when the enclosure 120 is mounted within the main frame 110.

The rotary drive mechanism 170 is arranged to provide rotary motion to the enclosure 120 within the main frame 110. In the present arrangement, the rotary drive mechanism 170 comprises an electric motor 172 having a driving portion 174. The driving portion 174 is connected via a transmission belt 176 to the driven portion 178.

The driven portion 178 is connected to the enclosure 120 at the first end 122 of the enclosure 120. In other arrangements, the rotary drive mechanism 170 may comprise any suitable source of rotary motion such as, for example, direct electric drive of the enclosure 120, hydraulic motor drive, hydrostatic motor drive, etc.

Figure 5:
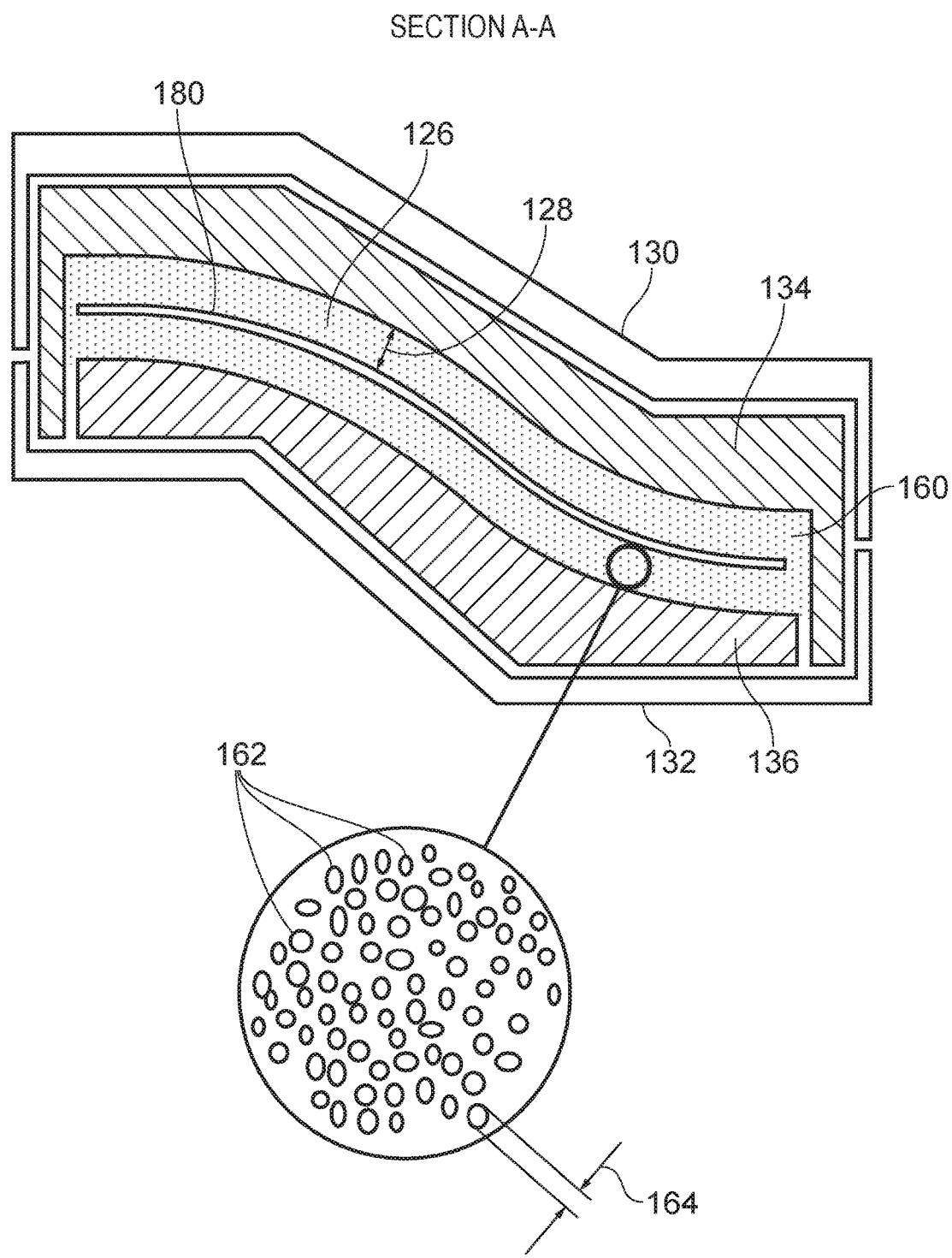
FIG. 5 shows a sectional view of the assembled enclosure of the vibropeening apparatus of FIG. 2.

As illustrated in FIG. 5, the enclosure 120 comprises a first enclosure half 130 and a co-operating second enclosure half 132. Within the first enclosure half 130 is located a first enclosure lining half 134. Within the second enclosure half 132 is located a second enclosure lining half 136.

Each of the first enclosure half 132 and the second enclosure half 134 is formed from a polymeric material. In an alternative arrangement, the first enclosure half 132 and the second enclosure half 134 may be formed from an alternative material such as, for example, a sheet metal or a fibre reinforced composite material.

Each of the first enclosure lining half 134 and the second enclosure lining half 136 is formed from a polyurethane material. In an alternative arrangement, the first enclosure lining half 134 and the second enclosure lining half 136 may be formed from another thermoplastic material.

When the first enclosure half 132 and the second enclosure half 134 are assembled together, the first enclosure lining half 134 and the second enclosure lining half 136 cooperate to define therebetween an internal volume 126. This internal volume 126 has the same geometry as the article 180 to be vibropeened.

The internal volume 126 is sized such that when the article 180 to be vibropeened is positioned in the internal volume 126, a predetermined clearance 128 is defined between the article 180 and the enclosure 120. This predetermined clearance 128 is defined over the entire extent of the article 180.

The article 180 to be vibropeened is attached to the first end 122 of the enclosure 120.

The internal volume 126 accommodates a vibropeening bed 160 within which is also located the article 180 to be vibropeened. The vibropeening bed 160 comprises a plurality of media particles 162. In the present arrangement, the media particles 162 are stainless steel balls having a mean media particle size 164, in this case a diameter, of 5 mm.

In other arrangements, the media particles 164 may take the form of a vibropeening media having alternative particle geometry. For example, the media particles may be spherical with a diameter larger or smaller than 5 mm. In a further alternative arrangement, the media particle geometry may be cubic, oblate spheroid, pyramidal, or a mixture thereof.

The enclosure 120 comprises a feed aperture 138 in an external surface. The feed aperture 138 allows for the ingress and egress of media particles 162 from the internal volume 126.

The enclosure 120 further comprises a window 140 in an external surface. The window 140 allows a user to visually inspect the vibropeening bed 160 located in the internal volume 126.

In use, the article 180 to be vibropeened is attached to the first end 122 of the enclosure 120. The first enclosure lining half 134 and the first enclosure half 130 are assembled over one side of the article 180. The second enclosure lining half 136 and the second enclosure half 132 are assembled over the opposite side of the article 180.

The assembled enclosure 120 defines an internal volume 126 between the first enclosure lining half 134 and the second enclosure lining half 136, with the article 180 being positioned centrally within the internal volume 126.

The vibropeening media particles 162 may then be poured into the internal volume 126 through the feed aperture 138.

The rotary drive mechanism 170 provides rotary motion to the enclosure 120. In one arrangement, this rotary motion is a unidirectional rotary motion. In other words, the enclosure 120 always rotates in the same rotational direction. In this arrangement, the rotary motion is approximately 1 to 2 rpm.

In an alternative arrangement, the rotary drive mechanism 170 provides an oscillatory rotary motion to the enclosure 110.

Upon completion of the vibropeening process, the vibropeening media particles 162 may be drained from the internal volume 126 within the enclosure 120 via the feed aperture 138. The enclosure 120 may then be removed from the main frame 110.

Disassembly of the enclosure 110 is the reverse of the assembly process described above.

While the embodiment described relates to the vibropeening of a fan blade for a turbofan gas turbine engine, it is to be understood that the apparatus and method of the present invention are equally applicable to other metallic components requiring vibropeening surface treatment.

Except where mutually exclusive, any of the features may be employed separately or in combination with any other features and the disclosure extends to and includes all combinations and sub-combinations of one or more features described herein.

The foregoing description of various aspects of the disclosure has been presented for purposes of illustration and description. It is not intended to be exhaustive or to limit the disclosure to the precise form disclosed, and obviously, many modifications and variations are possible. Such modifications and variations that may be apparent to a person of skill in the art are included within the scope of the disclosure as defined by the accompanying claims.

What is claimed is:

1. A vibropeening apparatus comprising:
   a main frame;
   an enclosure receivable within the main frame:
   a rotary drive mechanism; and
   an article to be vibropeened,
   wherein:
      the enclosure defines an internal volume, the internal volume accommodating a vibropeening bed, the article being positioned within the internal volume,
      the enclosure further comprises a first end and an opposite second end, and an axis of rotation extending between the first end and the second end, and wherein the article is removably secured to an internal surface of the first end of the enclosure, and
      the rotary drive mechanism is configured to impart a rotary motion to the enclosure within the main frame.

2. The apparatus as claimed in claim 1, wherein when the article is positioned within the internal volume, a predetermined clearance is defined between the article and the enclosure.

3. The apparatus as claimed in claim 1, wherein the vibropeening bed comprises a plurality of media particles, the media particles having a mean media particle size.

4. The apparatus as claimed in claim 3, wherein the predetermined clearance is approximately between five (5) and ten (10) times the mean media particle size.

5. The apparatus as claimed in 1, wherein the enclosure is removably mounted within the main frame.

6. The apparatus as claimed in claim 1, wherein the enclosure comprises a feed aperture, the feed aperture allowing for the ingress and egress of media particles.

7. The apparatus as claimed in claim 1, wherein the enclosure comprises an inner surface, the inner surface being formed from a thermoplastic polymeric material.

8. The apparatus as claimed in claim 1, wherein the enclosure further comprises a window allowing a visual inspection of the vibropeening bed.

9. The apparatus as claimed in claim 1, wherein the rotary motion is a unidirectional rotary motion.

10. The apparatus as claimed in claim 1, wherein the rotary motion is an oscillatory rotary motion.

11. A method of using a vibropeening apparatus, the apparatus comprising a main frame, an enclosure receivable within the main frame, and a rotary drive mechanism configured to rotate the enclosure, the method comprising the steps of:
   providing a vibropeening bed within the enclosure;
   positioning an article to be vibropeened within the vibropeening bed;
   attaching the article to one end of the enclosure;
   actuating the vibropeening bed; and
   rotating the enclosure within the main frame.

12. The method as claimed in claim 11, wherein the step of positioning an article to be vibropeened within the enclosure, comprises the step of:
   positioning an article to be vibropeened within the enclosure such that a predetermined clearance is defined between the article and the enclosure.

13. The method as claimed in claim 11, wherein the step of rotating the enclosure comprises the step of:
   rotating the enclosure in a unidirectional manner.

14. The method as claimed in claim 11, wherein the step of rotating the enclosure comprises the step of:
   rotating the enclosure in an oscillatory manner.

* * * * *